United States Patent
Kamijima

(10) Patent No.: US 8,595,524 B2
(45) Date of Patent: Nov. 26, 2013

(54) COMMUNICATION DEVICE WITH A POWER SUPPLY RESTART CONTROL UNIT CONTROLLING RESTARTING SUPPLY OF POWER TO A MAIN PROCESSING UNIT

(75) Inventor: Kyoichi Kamijima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 327 days.

(21) Appl. No.: 13/096,986

(22) Filed: Apr. 28, 2011

(65) Prior Publication Data

US 2011/0276813 A1    Nov. 10, 2011

(30) Foreign Application Priority Data

May 7, 2010    (JP) ................................ 2010-107472

(51) Int. Cl.
  *G06F 1/32*    (2006.01)
  *G06F 1/00*    (2006.01)

(52) U.S. Cl.
  USPC ........................... 713/320; 713/323; 713/324

(58) Field of Classification Search
  USPC ....................................................... 713/320
  See application file for complete search history.

(56) References Cited

U.S. PATENT DOCUMENTS

| | | | |
|---|---|---|---|
| 6,487,400 B2 * | 11/2002 | Joeressen et al. ........... | 455/343.1 |
| 7,555,662 B2 * | 6/2009 | Kidoguchi .................... | 713/323 |
| 7,913,256 B2 | 3/2011 | Torii et al. | |
| 8,024,593 B2 * | 9/2011 | Ito et al. ......................... | 713/324 |
| 8,352,664 B2 * | 1/2013 | Satoh ............................. | 710/310 |
| 8,370,664 B2 * | 2/2013 | Yamaguchi .................... | 713/323 |
| 8,386,819 B2 * | 2/2013 | Mizunashi .................... | 713/320 |
| 2005/0052506 A1 | 3/2005 | Yagi et al. | |
| 2005/0188142 A1 * | 8/2005 | Nakajima ..................... | 710/303 |
| 2006/0203041 A1 | 9/2006 | Shimada et al. | |

FOREIGN PATENT DOCUMENTS

| | | |
|---|---|---|
| CN | 1838077 A | 9/2006 |
| JP | 2005-045301 | 2/2005 |

* cited by examiner

*Primary Examiner* — Suresh Suryawanshi
(74) *Attorney, Agent, or Firm* — Maschoff Brennan

(57) ABSTRACT

A communication device includes a main processing unit and a sub-processing unit. The main processing unit includes a main performing unit that acquires time information indicating a performance time, stores the time information in a time information storing unit, sets a timer unit to detect that it is the time indicated by the time information, and performs the process when detecting that it is the time, and a power saving determining unit that transmits a report of detecting that a power saving performance condition is satisfied to the sub-processing unit. The sub-processing unit includes a power control unit that stops the supply of power to the main processing unit when receiving the report that the power saving performance condition is satisfied, and restarts the supply of power when the timer unit detects that it is the time indicated by the time information of the time information storing unit.

7 Claims, 4 Drawing Sheets

| TIME INFORMATION 14b | PROTOCOL 14c |
|---|---|
| 01/01/2010 10:00:00 | DHCP |
| 01/01/2010 10:05:00 | SNTP |
| ⋮ | ⋮ |

COMMUNICATION DEVICE WITH A POWER SUPPLY RESTART CONTROL UNIT CONTROLLING RESTARTING SUPPLY OF POWER TO A MAIN PROCESSING UNIT

BACKGROUND

1. Technical Field

The present invention relates to a communication device and the like including a main processing unit that perform a process, a sub-processing unit that performs a process with power lower than that of the main processing unit, and a shared memory to which both of the main processing unit and the sub-processing unit are accessible.

2. Related Art

In the related art, in a communication device such as a printer, a main processing unit and a sub-processing unit operating with power lower than that of the main processing unit are provided, and the supply of power to the main processing unit is stopped when predetermined conditions are satisfied, to reduce power consumption in the whole of the communication device.

In such a communication device, when the sub-processing unit (sub-device unit) receives data or the like to be processed in the main processing unit (main device unit), the supply of power to the main processing unit is restarted such that the data is processed in the main processing unit (e.g., see Japanese Patent No. 4271520).

Among the processes performed by the main processing unit are processes performed at predetermined time intervals, for example, a mail reception check process. For example, in Japanese Patent No. 4271520, a technique is disclosed in which the interval of the mail reception check is succeeded from the main processing unit to the sub-processing unit, and the mail reception check process is performed whenever the mail reception check interval elapses.

In the technique, the sub-processing unit succeeding the mail reception check interval measures the mail reception check interval again from the time point after the succeeding to start the mail reception check processing. For this reason, the mail reception check process is not performed at a time point (initially planned time point) which is initially planned in the main processing unit. For example, depending on the processes, it may be important to perform a process at the initially planned time point (or around the planned time point). In such a process, it is a great problem that the process is not performed at the initially planned time point or around the time point.

On the other hand, it is conceivable that a remaining time to the initially planned time point is succeeded to the sub-processing unit when the main processing unit is stopped. However, in the main processing unit, generally, an interface acquiring the remaining time from the timer which is counting the time is not provided, and it is time-consuming and difficult to acquire the remaining time in the main processing unit. Even if the remaining time can be acquired, time is necessary to succeed the remaining time from the main processing unit to the sub-processing unit. Accordingly, there is a problem that the time cannot be accurately measured in the sub-processing unit.

SUMMARY

An advantage of some aspects of the invention is to provide a technique in which a process to be performed in the main processing unit can be performed at the proper timing even when the operation of the main processing unit is stopped.

According to a first aspect of the invention, there is provided a communication device including: a main processing unit that performs a process; a sub-processing unit that performs a process with power lower than that of the main processing unit; and a shared memory to which both of the main processing unit and the sub-processing unit are accessible, wherein the main processing unit includes a first timer unit that measures time, a time information acquiring unit that acquires time information indicating time to perform the process to be performed in the main processing unit, a time information storing unit that stores the acquired time information in the shared memory, a first timer setting unit that sets the first timer unit to detect that it is the time indicated by the acquired time information, a process performing unit that performs the process to be performed when the first timer unit detects that it is the time, a performance detecting unit that detects whether or not a predetermined power saving performance condition is satisfied, and a reporting unit that reports that the predetermined power saving performance condition is satisfied to the sub-processing unit when it is detected that the predetermined power saving performance condition is satisfied, and wherein the sub-processing unit includes a second timer unit that measures time, a power supply stop control unit that stops the supply of power to the main processing unit when receiving a report that the power saving performance condition is satisfied, a second timer setting unit that sets the second timer unit to detect that it is the time determined on the basis of the time information of the shared memory, and a power supply restart control unit that restarts a control of restarting the supply of power to the main processing unit when the second timer unit detects that it is the time determined on the basis of the time information.

According to the communication device, the time information indicating the time to perform the process to be performed in the main processing unit is acquired, and the acquired time information is stored in the shared memory to be recognizable as the same time in the main processing unit and the sub-processing unit. When it is detected that the predetermined power saving performance condition is satisfied, the supply of power to the main processing unit is stopped. The second timer unit is set to detect that it is the time determined on the basis of the time information of the shared memory, and the supply of power to the main processing unit is restarted when the second timer unit detects that it is the time determined on the basis of the time information. Accordingly, it is possible to appropriately operate the main processing unit at the time to perform the process or around the time. For this reason, it is possible to appropriately perform the process to be performed in the main processing unit.

In the communication device, it is preferable that the first timer setting unit sets the first timer unit to detect that it is the time indicated by the time information stored in the shared memory when the supply of power is restarted. According to the communication device, the main processing unit to which the supply of power is restarted can detect that it is the time indicated by the time information stored in the shared memory, and can appropriately perform the process to be performed.

In the communication device, it is preferable that the time information acquiring unit acquires time information indicating a plurality of times of performing a plurality of processes to be performed in the main processing unit, the time information storing unit stores the time information indicating the plurality of times in the shared memory, and the second timer setting unit sets the second timer unit to detect that it is the closest time of the times determined on the basis of the time information stored in the shared memory.

According to the communication device, it is detected that it is the closet time of the times determined on the basis of the time information stored in the shared memory, and the supply of power to the main processing unit is restarted. Accordingly, it is possible to appropriately perform the process to be performed at the closet time.

In the communication device, it is preferable that the plurality of processes to be performed in the main processing unit are different kinds of processes. According to the communication device, it is possible to appropriately perform the plurality of different kinds of processes.

In the communication device, it is preferable that the process to be performed in the main processing unit is a network protocol process. According to the communication device, the main processing unit can appropriately perform the network protocol process.

In the communication device, it is preferable that the first timer unit and the second timer unit are adjusted to measure a system clock indicating the same time, and the time information is a clock count from a predetermined time point corresponding to the system clock to the time to performing the process. According to the communication device, by one clock count, it is possible to recognize the times to perform the process as the same time by the first timer unit and the second timer unit.

According to a second aspect of the invention, there is provided a process control method of a communication device including a main processing unit that performs a process, a sub-processing unit that performs a process with power lower than that of the main processing unit, and a shared memory to which both of the main processing unit and the sub-processing unit are accessible, the method including: acquiring time information indicating time to perform the process to be performed in the main processing unit; storing the acquired time information in the shared memory; setting the first timer unit to detect that it is the time indicated by the acquired time information; detecting whether or not a predetermined power saving performance condition is satisfied; reporting that the predetermined power saving performance condition is satisfied to the sub-processing unit when it is detected that the predetermined power saving performance condition is satisfied; stopping the supply of power to the main processing unit when receiving the report that the power saving performance condition is satisfied, setting the second timer unit to detect that it is the time determined on the basis of the time information of the shared memory, and restarting a control of restarting the supply of power to the main processing unit when the second timer unit detects that it is the time determined on the basis of the time information.

According to the process control method, the time information indicating the time to perform the process to be performed in the main processing unit is acquired, and the acquired time information is stored in the shared memory to be recognizable as the same time in the main processing unit and the sub-processing unit. When it is detected that the predetermined power saving performance condition is satisfied, the supply of power to the main processing unit is stopped. The second timer unit is set to detect that it is the time determined on the basis of the time information of the shared memory, and the supply of power to the main processing unit is restarted when the second timer unit detects that it is the time determined on the basis of the time information. Accordingly, it is possible to appropriately operate the main processing unit at the time to perform the process or around the time.

For this reason, it is possible to appropriately perform the process to be performed in the main processing unit.

BRIEF DESCRIPTION OF THE DRAWINGS

The invention will be described with reference to the accompanying drawings, wherein like numbers reference like elements.

FIG. 2 is a diagram illustrating an example of a time information table according to the embodiment of the invention.

DESCRIPTION OF EXEMPLARY EMBODIMENTS

An Embodiment of the invention will be described with reference to the drawings. The embodiment described hereinafter does not limit the invention according to the Claims, and all the elements and compositions described in the embodiment are not essential for the resolution means.

First, a printer as an example of a communication device according to the embodiment will be described.

Figure 1:
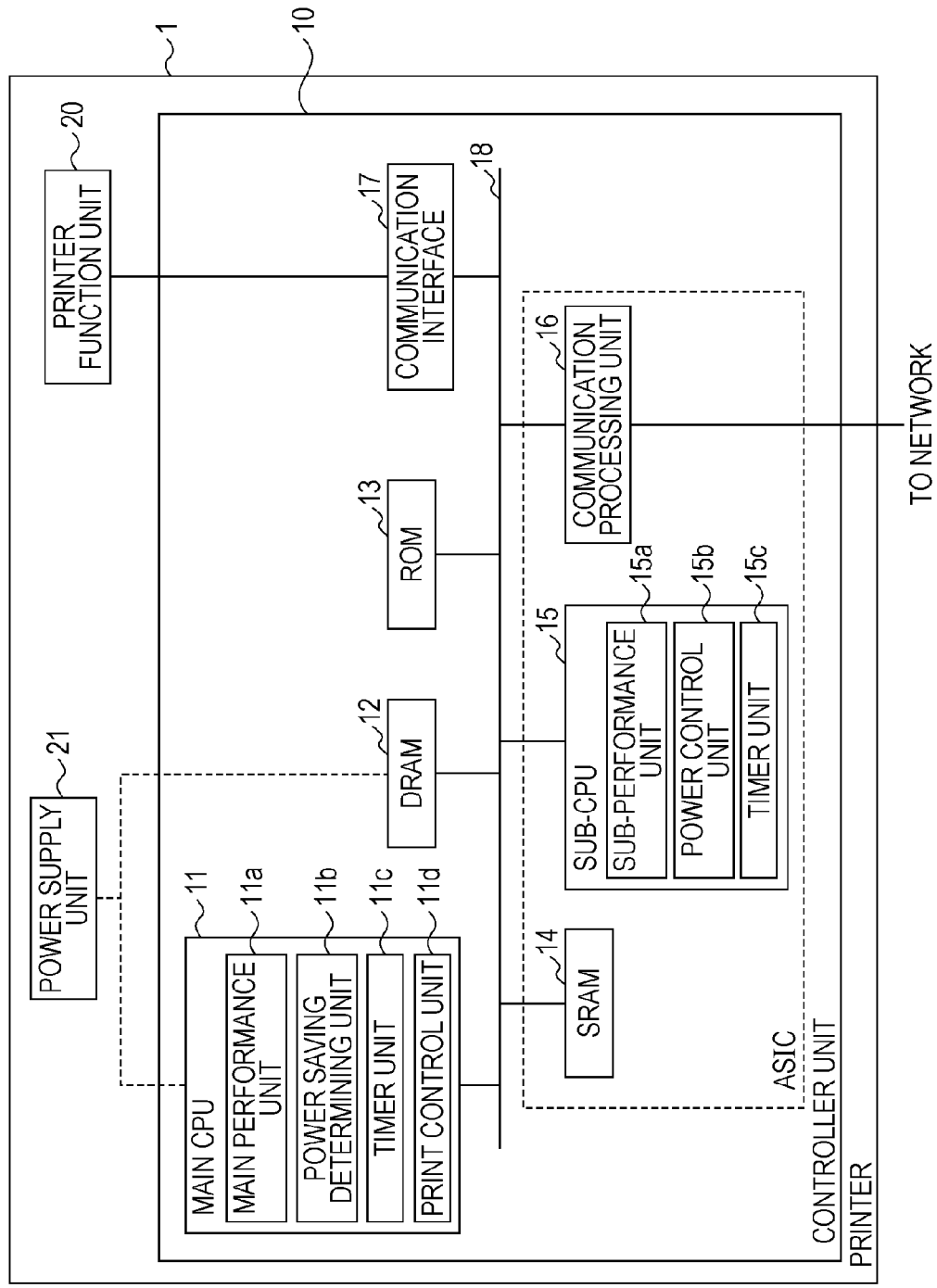
FIG. 1 is a diagram illustrating a configuration of a printer according to an embodiment of the invention.

FIG. 1 is a diagram illustrating a configuration of the printer according to the embodiment of the invention.

The printer 1 mainly includes a controller unit 10, a print function unit 20, and a power supply unit 21. The print function unit 20 forms an image on a predetermined image forming medium (paper, OHP, sheet, and the like) on the basis of a control of the controller unit 10. The power supply unit 21 supplies power from a commercial power supply (not shown) to function units (for example, main CPU 11, DRAM 12, and the like) of the printer 1 or stops the supply of power to the function units on the basis of the control of the controller unit 10.

The controller unit 10 includes a main CPU (Central Processing Unit) 11 as an example of the main processing unit, a DRAM (Dynamic Random Access Memory) 12, a ROM (Read Only memory) 13, an SRAM (Static Random Access Memory) 14 as an example of the shared memory, a sub-CPU 15 as an example of the sub-processing unit, a communication processing unit 16, a communication interface 17, and a bus 18 connecting each part to each other.

The DRAM 12 is used as an area of storing programs and data, or used as a work area of storing data used in a process performed by the main CPU 11. The ROM 13 stores a boot program and programs of various processes performed by the main CPU 11 and the sub-CPU 15.

The SRAM 14 is a smaller storage capacitance memory compared to the DRAM 12 and stores various kinds of information. The SRAM 14 can perform reading and writing from both of the main CPU 11 and the sub-CPU 15. In the embodiment, the SRAM 14 stores a time information table 14a.

FIG. 2 is a diagram illustrating a time information table according to the embodiment of the invention.

The time information table 14a associates and stores time information 14b indicating the time to perform a process and a protocol 14c of performing a process. In FIG. 2, for convenience, the year, month, day, hour, minute, and second are described as the time information, but the time information is actually a clock count (for example, the number of seconds)

from a predetermined time point (for example, A.M. 00:00, Jan. 1, 1970) to the performance time, corresponding to a system clock in the timer unit 11c and the timer unit 15c. An example of the protocol 14c is a network protocol such as DHCP (Dynamic Host Configuration Protocol) and SNTP (Simple Network Time Protocol).

Returning to the description of FIG. 1, the communication processing unit 16 transmits a communication packet received from the main CPU 11 or the sub-CPU 15, to a network. The communication processing unit 16 receives the communication packet received from the network, and transmits the communication packet to the main CPU 11 or the sub-CPU 15. The communication interface 17 intermediates communication between the main CPU 11 and the print function unit 20.

The main CPU 11 includes a main performing unit 11a as the time information acquiring unit, the time information storing unit, the first timer setting unit, the process performing unit, and the reporting unit, and the power saving determining unit 11b as the performance detecting unit, a timer unit 11c as the first timer unit, and a print control unit 11d.

The main performing unit 11a controls communication with the network through the communication processing unit 16. The main performing unit 11a performs a network protocol process such as DHCP, SNTP, and WSD process (Web Services on Devices). When the main performing unit 11a receives the report of detecting that it is the set time (the time elapses) from the timer unit 11c, the main performing unit 11a performs a process to be performed at that time.

The main performing unit 11a acquires time information indicating the time (performance time) to perform a part of processes in the network protocol process. The acquired time information may indirectly indicate the time such as after 10 minutes from any time point, or may directly indicate the time. The main performing unit 11a may acquire the time information from the setting of the program of the network protocol process, and may acquire the time information from an external device (for example, a DHCP server in a case of a process (a DHCP process) according to DHCP).

The main processing unit 11a stores the acquired time information in the time information table 14a of the SRAM 14 immediately after acquiring the time information. In the embodiment, the main performing unit 11a stores the system clock corresponding to the time indicated by the acquired time information as the time information in the SRAM 14. In the embodiment, when the main performing unit 11a acquires the time information indirectly indicating the time, the main performing unit 11a converts the time into time information indicating direct time and stores the time information in the time information table 14a.

When the supply of power by the power supply unit 21 is restarted, the main performing unit 11a acquires the time information stored in the time information table 14a stored in the SRAM 14, and sets the timer unit 11c to detect that it is the time indicated by the time information. Specifically, the main performing unit 11a sets the timer unit 11c to detect that the time of difference between the time information of the SRAM 14 and the system clock at that time point elapses.

The power saving determining unit 11b determines whether or not a predetermined power saving condition is satisfied, and transmits a power saving performance report to the power control unit 15b of the sub-CPU 15 when the power saving performance condition is satisfied. As the power saving performance condition, for example, there is a case where the printer 1 does not receive data (for example, printing data and the like) used in the main CPU 11 from an external device during a predetermined time or more.

The timer unit 11c measures the time from a reference time point. In the embodiment, the timer unit 11c displays the time to be a system clock indicating the same time as that of the timer unit 15c of the sub-CPU 15. Specifically, an initial time may be acquired from the same part (real time clock or device) as that of the timer unit 15c of the sub-CPU 15, or the time measured by the timer unit 11c or the timer unit 15c may be provided from one to the other of the main CPU 11 or the sub-CPU 15, thereby being the same. The timer unit 11c detects and reports that it is the set time (specifically, the time elapses to the set time) to the main performing unit 11a.

The print control unit 11d controls the print function unit 20 to form a predetermined image on an image forming medium according to the printing data received through the network by the communication processing unit 16.

The sub-CPU 15 includes a sub-performing unit 15a as an example of the second timer setting unit, a power control unit 15b as an example of the power supply stop control unit and the power supply restart control unit, and a timer unit 15c as an example of the second timer unit. Power consumption of the sub-CPU 15 is lower than power consumption of the main CPU 11 in a general operation.

When the sub-performing unit 15a receives the power saving performance report from the main CPU 11, the sub-performing unit 15a takes the time information out of the time information table 14a stored in the SRAM 14, and sets the timer unit 15c to detect that it is the time indicated by the time information. Specifically, the sub-performing unit 15a sets the timer unit 15c to detect that the time of the difference between the time indicated by the time information of the SRAM 14 and the system clock elapses. In the embodiment, the sub-performing unit 15a determines the closest planned time of the times indicated by the time information in the time information table 14a, and sets the timer unit 15c to detect that it is the time.

When power is not supplied to the main CPU 11, the sub-performing unit 15a controls communication with the network through the communication processing unit 16. When the sub-performing unit 15a receives the report of detecting that it is the set time from the timer unit 15c, the sub-performing unit 15a transmits the report that the power saving release condition to the power control unit 15b is satisfied. The sub-performing unit 15a determines whether or not the received data can be responded to the sub-performing unit 15a. When the data can be responded, the sub-performing unit 15a performs a predetermined protocol process using the data. When the data cannot be responded, the sub-performing unit 15a transmits the report that the power saving release condition is satisfied to the power control unit 15b. In the embodiment, the sub-performing unit 15a can perform a network protocol process such as SNMP (Simple Network Management Protocol), SLP (Service Location Protocol), and ARP (Address Resolution Protocol), and performs these processes when the processes cannot be performed by the main CPU 11, such as when power is not supplied to the main CPU 11.

When the power control unit 15b receives the power saving performance report from the main CPU 11, the power control unit 15b controls the power supply unit 21 to stop the supply of power to the main CPU 11 and DRAM 12. When the power control unit 15b receives the report that the power saving release condition is satisfied, the power control unit 15b controls the power supply unit 21 to restart the supply of power to the main CPU 11 and the DRAM 12 and sets on a flag indicating a returning operation to on the SRAM 14.

The timer unit 15c measures the time from the reference time point. In the embodiment, the timer unit 15c measures the time to be the same time (system clock) as that of the timer unit 11c of the main CPU 11. Specifically, an initial time may be acquired from the same part (real time clock or device) as that of the timer unit 11c of the main CPU 11, or the time measured by the timer unit 11c or the timer unit 15c may be provided from one to the other of the main CPU 11 or the sub-CPU 15, thereby being the same. The timer unit 15c detects and reports that it is the set time (specifically, the time elapses to the set time) to the sub-performing unit 15a.

A process operation in the printer according to the embodiment of the invention will be described.

Figure 3:
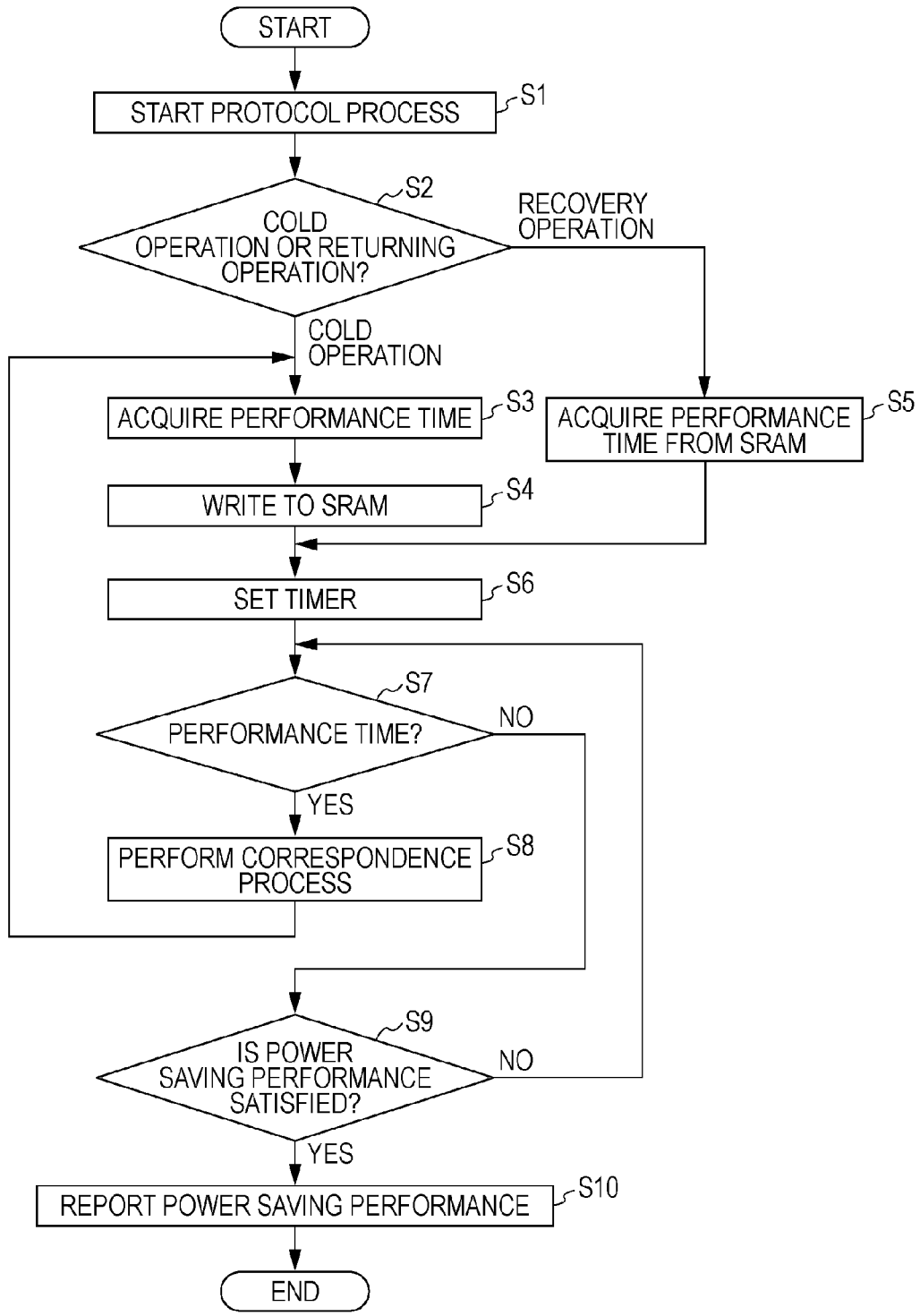
FIG. 3 is a flowchart illustrating a control process performed by a main CPU according to the embodiment of the invention.

FIG. 3 is a flowchart illustrating a control process performed by the main CPU according to the embodiment of the invention.

First, when the main CPU 11 starts operating by supplying power, the main CPU 11 starts performing a program such as an OS, and then starts the network protocol process (Step S1).

Then, the main performing unit 11a of the main CPU 11 determines whether the operation is a cold operation (operation by turning on the printer 1) or a returning operation (operation by restarting the supply of power to the main CPU 11 in the power saving state) (Step S2). It can be determined whether or not the operation is the cold operation or the returning operation according to whether or not the flag indicating the returning operation stored in the SRAM 14 is ON.

As a result, when it is determined that the operation is the cold operation (Step S2: cold operation), the main performing unit 11a acquires the performance time of a predetermined process in the protocol process (Step S3), writes the performance time into the SRAM 14 (Step S4), and sets the timer unit 11c to further detect the time point when it is the performance time, that is, to measure and report the remaining time from the current time to the performance time (Step S6).

Meanwhile, when it is determined that the operation is the returning operation (Step S2: returning operation), the main performing unit 11a acquires the performance time (a plurality of performance times when there are a plurality of performance times) from the time information table 14a of the SRAM 14 (Step S5), and sets the timer unit 11c to detect the time point when it is the performance time, that is, to measure and report the remaining time to the performance time (Step S6). Accordingly, the main performing unit 11a can reset the timer unit 11c to detect the performance time set in advance.

The timer unit 11c detects whether or not it is the performance time, that is, whether or not there is no remaining time to the performance time (Step S7). When it is detected that it is the performance time (Step S7: Yes), the timer unit 11 transmits the report that it is the performance time to the main performing unit 11a. When the main performing unit 11a receives the report that it is the performance time, the main performing unit 11a performs a process corresponding to be performed at the performance time (Step S8), and returns to Step S3.

Meanwhile, when it is not detected that it is the performance time (Step S7: No), the power saving determining unit 11b determines whether or not the predetermined power saving performance condition is satisfied (Step S9). When the predetermined power saving performance condition is not satisfied (Step S9: No), the process returns to Step S7. Meanwhile, when the predetermined power saving performance condition is satisfied (Step S9: Yes), the power saving determining unit 11b transmits the power saving performance report (report that the power saving condition is satisfied) to the sub-CPU 15 (Step S10). Accordingly, the supply of power to the main CPU 11 is stopped by a process of the sub-CPU shown in FIG. 4 to be described later, and the power consumption in the printer 1 is reduced.

Figure 4:
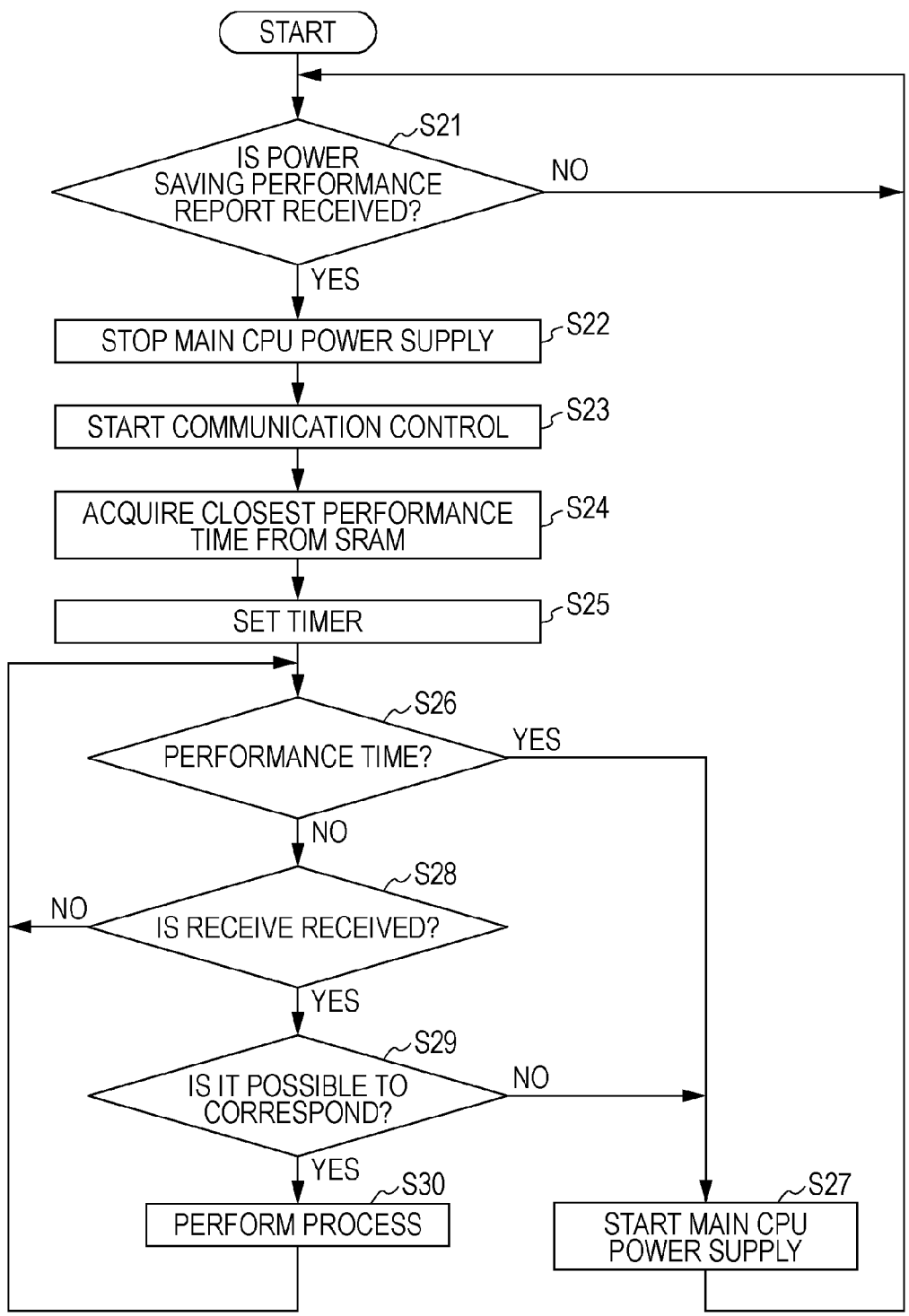
FIG. 4 is a flowchart illustrating a control process performed by a sub-CPU according to the embodiment of the invention.

FIG. 4 is a flowchart illustrating a control process performed by the sub-CPU according to the embodiment of the invention.

The power control unit 15b determines whether or not the power saving performance report is received from the main CPU 11 to the sub-CPU 15 (Step S21). When the power saving performance report is not received (Step S21: No), the power control unit 15b waits until the power saving performance report is received. Meanwhile, when the power saving performance report is received (Step S21: Yes), the power control unit 15b controls the power supply unit 21 to stop the supply of power to the CPU 11 and the DRAM 12 (Step S22). Accordingly, it is possible to reduce the power consumption in the printer 1.

Then, the sub-performing unit 15a starts a control of communication with the network through the communication processing unit 16 (Step S23). Accordingly, the sub-performing unit 15a can transmit and receive the communication packet through the communication processing unit 16.

Then, the sub-performing unit 15a acquires the closet planned performance time among the times indicated by the time information in the time information table 14a of the SRAM 14 (Step S24), and sets the timer unit 15c to detect that it is the performance time (Step S25).

The timer unit 15c detects whether or not it is the performance time, that is, whether or not there is no remaining time to the performance time (Step S26). When it is detected that it is the performance time (Step S26: Yes), the timer unit 15c transmits the report that it is the performance time to the sub-performing unit 15a. When the sub-performing unit 15a receives the report that it is the performance time from the timer unit 15c, the sub-performing unit 15a transmits the report that the power saving release condition to the power control unit 15b is satisfied. When the power control unit 15b receives the reports that the power saving release condition is satisfied, the power control unit 15b controls the power supply unit 21 to restart the supply of power to the main CPU 11 and the DRAM 12 (Step S27). Accordingly, the operation of the main CPU 11 is restarted, and it is possible to appropriately perform the process. Accordingly, it is possible to appropriately restart the operation of the main CPU 11 at the preset performance time.

Meanwhile, when it is determined that it is not the performance time (Step S26: No), the sub-performance unit 15a determines whether or not the data is received through the communication processing unit 16 (Step S28). When the data is not received (Step S28: No), the process returns to Step S26. Meanwhile, when the data is received (Step S28: Yes), the sub-performing unit 15a determines whether or not the data is data which can be responded by the sub-performing unit 15a (Step S29).

As a result, when the data is the data that is able to respond (Step S29: Yes), the sub-performing unit 15a performs a predetermined protocol process using the data and performs a response (Step S30). Accordingly, it is possible to perform the predetermined protocol process without operating the main CPU 11. Meanwhile, when the data is not the data that is able to respond (Step S29: No), the sub-performing unit 15a stores the received data in the SRAM 14, and transmits the report that the power saving release condition to the power control unit 15b is satisfied. When the power control unit 15b receives the reports that the power saving release condition is satisfied, the power control unit 15b controls the power supply unit 21 to restart the supply of power to the main CPU 11 and the DRAM 12 (Step S27). Accordingly, the main CPU 11 starts the operation, the process using the reception data stored in the SRAM 14 to be a performable state.

The invention has been described above with reference to the embodiment, but the invention is not limited to the above-described embodiment, and can be applied to various other aspects.

For example, in the embodiment, the timer unit 11c of the main CPU 11 and the timer unit 15c of the sub-CPU 15 are adjusted to be the system clock indicating the same time, and the clock count from the predetermined reference time point to the designated time is used, but the invention is not limited thereto. For example, when the timer unit 11c and the timer unit 15c are the different system clocks, the time information may include, for example, clock counts from the predetermined reference time point to the designated time corresponding to the system clocks of the timer units 11c and 15c.

The time information may be a clock count for either system clock of the timer units 11c and 15c. As described above, when any one clock count is stored, it is preferable that correspondence between one clock count and the other clock count is grasped for the main CPU 11 and the sub-CPU 15, and one clock count of the SRAM 14 is converted into the other clock count as necessary on the basis of the correspondence.

In the embodiment, the timer unit 15c detects that it is the time corresponding to the time information to restart the supply of power to the main CPU 11, but the invention is not limited thereto. For example, the timer unit 15c may detect that it is the vicinity of the time corresponding to the time information, for example, it is the time before the time by a predetermined time (for example, before 30 seconds) to restart the supply of power to the main CPU 11. An example of the predetermined time may be a time necessary from the time of starting the supply of power to the main CPU 11 to the time when the process can be performed.

In the embodiment, even after the communication process of the communication packet is transferred from the sub-CPU 15 to the main CPU 11, the supply of power to the sub-CPU 15 is continued, but the invention is not limited thereto. After the communication process of the communication packet is transferred to the main CPU 11, the supply of power to the sub-CPU 15 may be stopped. In this case, it is possible to further reduce the power consumption.

In the embodiment, the printer has been described as an example of the communication device, but the communication device is not limited thereto. For example, the communication device may be a scanner, a PC, or the like, and it is only important that the communication device has the main processing unit and the sub-processing unit.

The entire disclosure of Japanese Patent Application No. 2010-107472, filed May 7, 2010 is expressly incorporated by reference herein.

What is claimed is:

1. A communication device comprising:
a main processing unit that performs a process;
a sub-processing unit that performs a process with power lower than that of the main processing unit; and
a shared memory to which both of the main processing unit and the sub-processing unit are accessible,
wherein the main processing unit includes
a first timer unit that measures time,
an information acquiring unit that acquires time information indicating time to perform the process to be performed in the main processing unit,
a time information storing unit that stores the acquired time information in the shared memory,
a first timer setting unit that sets the first timer unit to detect that it is the time indicated by the acquired time information,
a process performing unit that performs the process to be performed when the first timer unit detects that it is the time,
a performance detecting unit that detects whether or not a predetermined power saving performance condition is satisfied, and
a reporting unit that transmits a report that the predetermined power saving performance condition is satisfied to the sub-processing unit when it is detected that the predetermined power saving performance condition is satisfied, and
wherein the sub-processing unit includes
a second timer unit that measures time,
a power supply stop control unit that stops the supply of power to the main processing unit when receiving the report that the power saving performance condition is satisfied,
a second timer setting unit that sets the second timer unit to detect that it is the time determined on the basis of the time information of the shared memory, and
a power supply restart control unit that restarts a control of restarting the supply of power to the main processing unit when the second timer unit detects that it is the time determined on the basis of the time information.

2. The communication device according to claim 1, wherein the first timer setting unit sets the first timer unit to detect that it is the time indicated by the time information stored in the shared memory when the supply of power is restarted.

3. The communication device according to claim 1, wherein the time information acquiring unit acquires time information indicating a plurality of times of performing a plurality of processes to be performed in the main processing unit,
wherein the time information storing unit stores the time information indicating the plurality of times in the shared memory, and
wherein the second timer setting unit sets the second timer unit to detect that it is the closest time of the times determined on the basis of the time information stored in the shared memory.

4. The communication device according to claim 3, wherein the plurality of processes to be performed in the main processing unit are different kinds of processes.

5. The communication device according to claim 1, wherein the process to be performed in the main processing unit is a network protocol process.

6. The communication device according to claim 1, wherein the first timer unit and the second timer unit are adjusted to measure a system clock indicating the same time, and
wherein the time information is a clock count from a predetermined time point corresponding to the system clock to the time to perform the process.

7. A process control method of a communication device including a main processing unit that performs a process, a sub-processing unit that performs a process with power lower than that of the main processing unit, and a shared memory to which both of the main processing unit and the sub-processing unit are accessible, the method comprising:
acquiring time information indicating time to perform the process to be performed in the main processing unit;
storing the acquired time information in the shared memory;
setting the first timer unit to detect that it is the time indicated by the acquired time information;

detecting whether or not a predetermined power saving performance condition is satisfied;

reporting that the predetermined power saving performance condition is satisfied to the sub-processing unit when it is detected that the predetermined power saving performance condition is satisfied;

stopping the supply of power to the main processing unit when receiving the report that the power saving performance condition is satisfied, setting the second timer unit to detect that it is the time determined on the basis of the time information of the shared memory, and restarting a control of restarting the supply of power to the main processing unit when the second timer unit detects that it is the time determined on the basis of the time information.

* * * * *